United States Patent

Meeuwissen

[11] Patent Number: 5,709,835
[45] Date of Patent: Jan. 20, 1998

[54] HEATING MOLTEN METAL

[75] Inventor: Rodney Meeuwissen, Yellow Rock, Australia

[73] Assignees: Ishikawajima-Harima Heavy Industries Company, Tokyo, Japan; BHP Steel (JLA) Pty Ltd., Melbourne, Australia

[21] Appl. No.: 717,182

[22] Filed: Sep. 20, 1996

[30] Foreign Application Priority Data

Oct. 16, 1995 [AU] Australia ............... PN5950

[51] Int. Cl.⁶ ........................... C21C 7/00
[52] U.S. Cl. ............... 266/217; 266/200; 75/10.14
[58] Field of Search ................... 266/200, 216, 266/217; 373/22, 64; 75/10.22, 10.14

[56] References Cited

U.S. PATENT DOCUMENTS

| | | | |
|---|---|---|---|
| 4,152,532 | 5/1979 | Eguchi et al. | 373/22 |
| 4,632,700 | 12/1986 | Bebber et al. | 75/10.14 |
| 4,686,687 | 8/1987 | Mure et al. | 373/22 |
| 4,734,551 | 3/1988 | Cheek | 75/10.22 |

FOREIGN PATENT DOCUMENTS

| | | | |
|---|---|---|---|
| 403221246 | 9/1991 | Japan | 75/10.22 |
| 403238151 | 10/1991 | Japan | 75/10.22 |

Primary Examiner—Scott Kastler
Attorney, Agent, or Firm—Nikaido Marmelstein Murray & Oram, LLP.

[57] ABSTRACT

Apparatus for applying heat to a reservoir (27) of molten metal, comprising a plasma torch (48) and a metal contact electrode (52) to complete an electrical circuit with the torch (48) via the molten metal in the reservoir (27). The plasma torch (48) and the metal contact electrode (52) are both mounted on a stand (51) for up and down movements as a unit so as that the plasma torch (48) is moveable downwardly into proximity with the surface of the reservoir of molten metal and the metal contact electrode is simultaneously insertable into the molten metal and withdrawable therefrom. The metal contact electrode (52) is formed with an interior passage (63) for flow of gas therethrough into the molten metal and there is provided a gas pressure detector (65) to detect a change in gas pressure consequent on breakage of the metal contact electrode (52).

3 Claims, 2 Drawing Sheets

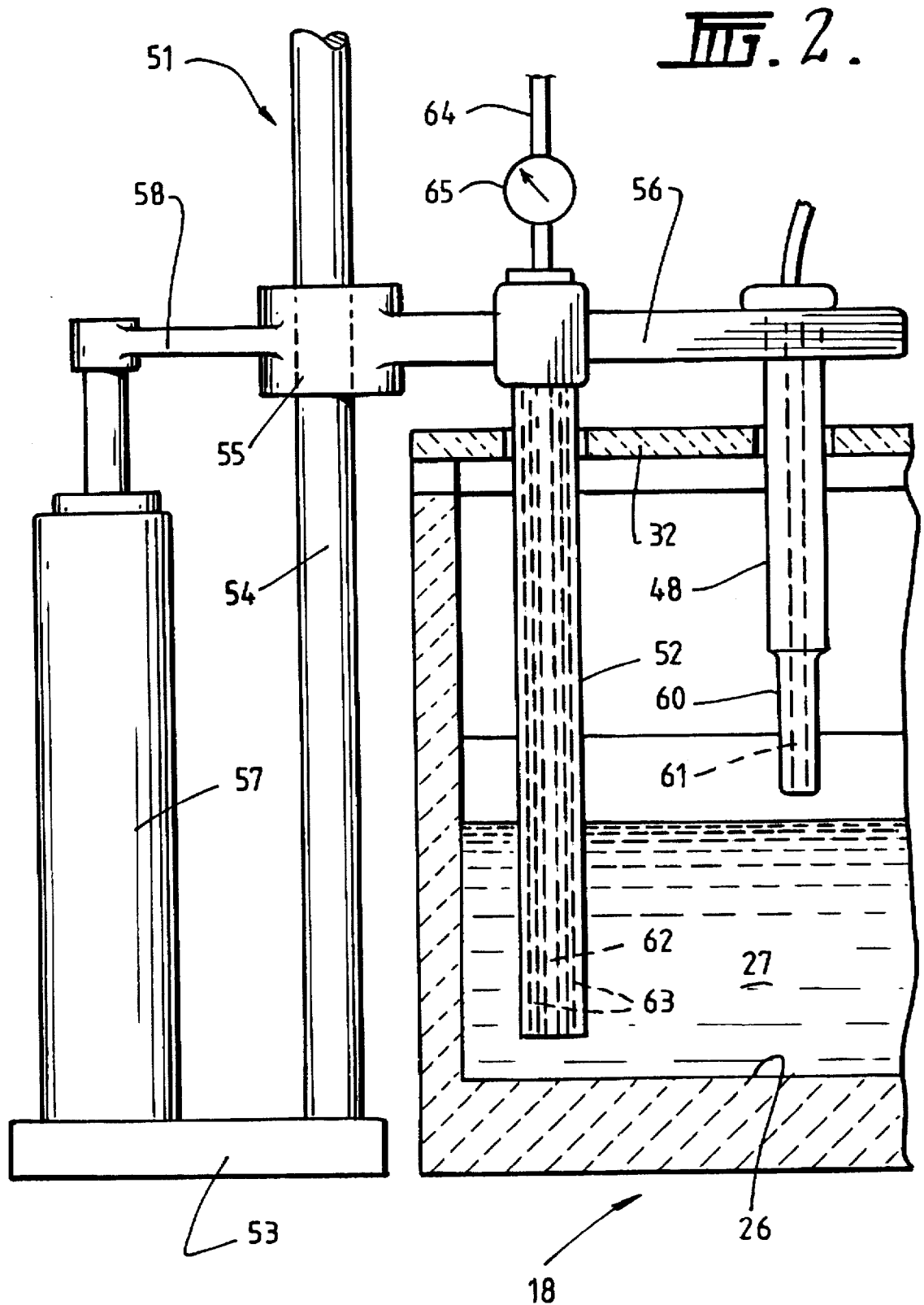

1

HEATING MOLTEN METAL

BACKGROUND TO THE INVENTION

This invention relates to apparatus for heating molten metal. It has particular but not exclusive application to apparatus for heating molten metal before it is supplied to a continuous caster such as a twin roll caster.

Continuous casting techniques, particularly the twin roll casting of molten steel, require molten metal to be supplied to a caster at very high temperatures and the metal can tend to cool very rapidly after it is supplied from a ladle to a metal delivery system which delivers it to the caster. It has therefore been proposed to supply supplementary heating by means of a plasma torch as it flows through the delivery system to the caster. Such proposals are for example described in U. S. Pat. No. 4,646,534 and Japanese Patent Publications Nos J58-100951 and J59-9202142.

In applying heat to a reservoir of molten metal through a plasma torch it is necessary to provide an electrode providing good electrical contact with the molten metal to complete an electrical circuit with the torch electrode which is held near the surface of the molten metal and is supplied with a flow of gas to create the electrically conducting plasma. The torch electrode may be a negative electrode and the electrode contacting the molten metal may be positive as disclosed in Japanese Publication J58-100951 but it is generally preferred that the torch electrode be positive and that the metal contact electrode be a negative or grounding electrode. The provision of a satisfactory metal contacting electrode is difficult in the harsh environment encountered in the casting of molten metal, particularly in the casting of molten steel. In a continuous caster, the metal delivery system normally includes a tundish to hold a reservoir of molten metal supplied from a ladle. In this case, the electrode is generally provided by a refractory material which is fixed in place in the tundish, where it is particularly susceptible to damage either during initial pouring or during clean-up after a cast due to solidification of metal on the interior surfaces of the tundish and the surfaces of components within it. Loss of proper electrical contact during plasma torch heating can lead to the formation of an alternative electrical return path which can precipitate a "break-out" of molten metal through the walls of the tundish into the environs which is dangerous and requires immediate interruption of the casting process. The present invention avoids these problems by the provision of apparatus which enables a metal contact electrode to be readily moved into and out of contact with the molten metal to be heated.

SUMMARY OF THE INVENTION

According to the invention there is provided apparatus for applying heat to a reservoir of molten metal, comprising a plasma torch mounted on a stand for up and down movements so as to be moveable downwardly into proximity with the surface of a reservoir of molten metal to be heated and an electrode to contact the molten metal so as to complete an electrical circuit with the plasma torch which electrode is also mounted on the stand for up and down movements so as to be insertable into the molten metal and withdrawable therefrom.

Preferably the plasma torch and the electrode are mounted on the stand for up and down movement together as a unit.

Preferably further the electrode is set or can be adjusted relative to the plasma torch so as to project downwardly below the bottom of the plasma torch whereby to dip into the reservoir of molten metal to be heated as the bottom of the plasma torch approaches the surface of the molten metal.

The plasma torch may comprise a hollow torch electrode and means to supply a gas through the torch electrode to produce a plasma at the surface of the molten metal to be heated. The gas may for example be nitrogen or argon gas.

The torch electrode may in use be a direct current positive electrode and the metal contact electrode may be a negative or return electrode.

The return electrode may be made of a refractory material, for example alumina graphite. It may be formed with an interior passage for the flow of gas therethrough into the molten metal and it may be provided with a gas pressure detector to detect a change in gas pressure consequent on breakage of the metal contact electrode.

BRIEF DESCRIPTION OF THE DRAWINGS

In order that the invention may be more fully explained one particular embodiment will be described with reference to the accompanying drawings in which:

FIG. 2 is a cross-section on the line 2—2 in FIG. 1.

DESCRIPTION OF THE PREFERRED EMBODIMENT

Figure 1:
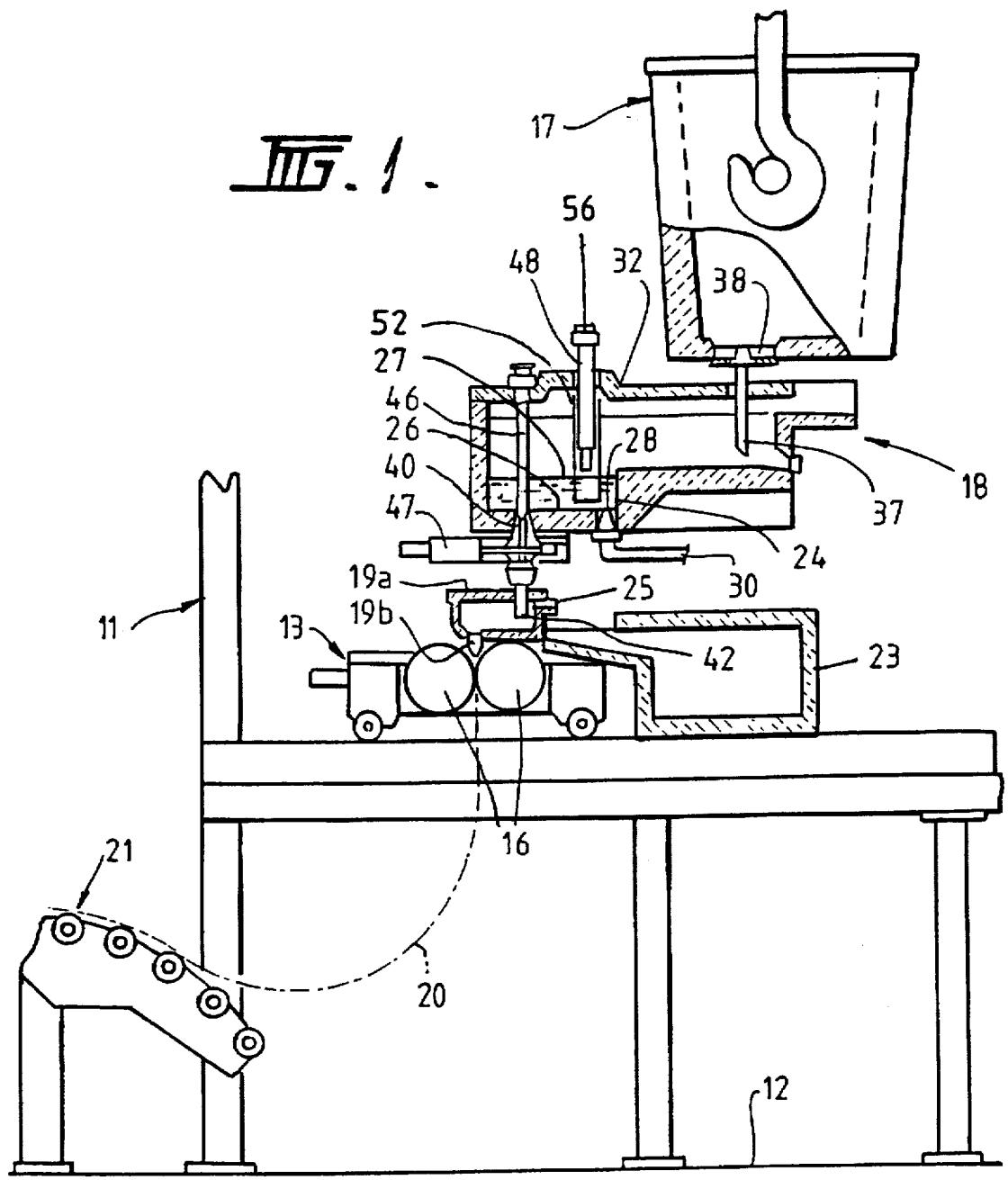
FIG. 1 is a side elevation of a continuous strip caster incorporating an apparatus constructed in accordance with the invention.

The caster illustrated in FIG. 1 comprises a main machine frame, generally identified by the numeral 11, which stands up from the factory floor 12. Frame 11 supports a casting roll carriage 13 which is horizontally movable between an assembly station and a casting station. Carriage 13 carries a pair of parallel casting rolls 16 which form a nip in which a casting pool of molten metal is formed and retained between two side plates or dams (not shown) held in sliding engagement with the ends of the rolls.

Molten metal is supplied during a casting operation from a ladle 17 via a tundish 18, delivery distributor 19a and nozzle 19b into the casting pool. Before assembly onto the carriage 13, tundish 18, distributor 19a, nozzle 19b and the side plates are all preheated to temperatures in excess of 1000° C. Nozzles 19b and the side plates may, for example, be preheated in specific preheat furnaces (not shown) whereas the tundish 18 and the distributor 19a may be heated by appropriate gas burners (also not shown). The manner in which these components may be preheated and moved into assembly on the carriage 13 is more fully disclosed in U.S. Pat. No. 5,184,668.

Casting rolls 16 are water cooled so that molten metal from the casting pool solidifies as shells on the moving roll surfaces and the shells are brought together at the nip between them to produce a solidified strip product 20 at the roll outlet. This product is fed to a run out table 21 and subsequently to a standard coiler. A receptacle 23 is mounted on the machine frame adjacent the casting station and molten metal can be diverted into this receptacle via an overflow spout 25 on the distributor 19a.

For reasons which are fully explained in our Australian Patent Application No 352/94, tundish 18 is able to hold an initial batch of molten metal which can be preheated to a temperature well above the liquidus temperature to be poured through the delivery nozzle on start-up after which molten metal from the ladle can be poured at a much lower temperature through the same tundish and delivery nozzle into the casting pool.

Tundish 18 is fitted with a lid 32 and its floor is stepped at 24 so as to form a recess or well 26 in the bottom of the tundish at its left-hand end as seen in FIG. 1. Molten metal is introduced into the right-hand end of the tundish from the ladle 17 via an outlet nozzle 37 and slide gate valve 38. At the bottom of well 26, there is an outlet 40 in the floor of the tundish to allow molten metal to flow from the tundish via an outlet nozzle 42 to the delivery distributor 19a and the nozzle 19b. The tundish 18 is fitted with a stopper rod 46 and slide gate valve 47 to selectively open and close the outlet 40 and effectively control the flow of metal through the outlet.

Well 26 in the bottom of the tundish is provided in order to receive the initial batch of molten metal so as to establish a reservoir 27 of molten metal which is to be preheated to a temperature in excess of the ladle temperature. For this purpose a plasma arc torch 48 is located above well 26 and can be extended downwardly so as to be operable to heat molten metal in the well.

An argon gas bubbler unit 28 is installed in the floor of the well and supplied with pressurised argon gas through a pipe 30 to produce bubbles of gas which rise through the reservoir of molten metal in the well to promote circulation in the region of the plasma arc torch and clear slag from the surface of the metal about the torch. It has been found that best results are achieved if the bubble unit has a pair of closely spaced porous outlets so as to release two closely spaced streams of bubbles which interact to maintain a steady vertically rising sheet of bubbles adjacent the plasma arc torch. If a single outlet is used the resulting single stream of bubbles tends to move about vertically and to break up. Good results are achieved with a gas flow of the order of 44 litres/minute and with the bubbles spaced about 200 mm from the plasma arc torch in a direction away from the tundish outlet 40 and toward the end of the tundish which receives molten metal from the ladle outlet nozzle 37. This ensures that the bubbles rise through the metal before it reaches the plasma arc torch zone in its flow from the ladle outlet nozzle 37 to the tundish outlet 40 so as to promote good circulation around the plasma arc torch zone and within the well 26.

In accordance with the present invention plasma torch 48 is mounted on a stand 51 for up and down movement relative to the stand and a metal contact electrode 52 is also mounted on the same stand for up and down movement relative to the stand. Stand 51 is disposed to one side of tundish 18. It comprises a base 53 and a mast 54 on which a carriage 55 is mounted for vertical up and down movement. Carriage 55 carries a cantilever arm 56 extending outwardly over the tundish 18 and supporting the plasma arc torch 48 and return electrode 52 such that they extend downwardly through openings in the tundish lid 32. Carriage 55 can be raised and lowered by operation of a pneumatic cylinder unit 57 acting between the stand base 53 and an arm 58 projecting from the carriage.

Torch 48 is of conventional construction. It comprises the usual torch electrode 60 and gas flow passages 61 for the flow of nitrogen or argon gas through to the bottom of the torch to produce a conducting plasma. Metal contact electrode 52 is formed of refractory material such as alumina graphite which may be formed around a central metal rod or core 62 to improve its structural rigidity. The refractory material is formed with one or more passages 63 to allow gas from a supply pipe 64 to pass downwardly through the electrode into the molten metal and a gas pressure detector 65 is provided in the supply pipe so as to detect a sudden decrease in gas pressure consequent on breakage of the refractory electrode.

Return electrode 52 is of such length and is mounted on the cantilever arm 54 relative to torch 48 such that it projects below the bottom end of torch 48. Accordingly, as the torch 48 and electrode 52 are lowered with the arm 56, the electrode 52 will dip into the reservoir 27 of molten metal as the bottom end of the plasma torch approaches the molten metal surface and comes to its operating position. Accordingly the torch and the electrode can be brought into proper operating position very rapidly regardless of the level of the reservoir of metal to be heated. Moreover, in the event of an electrode breakage or malfunction, the electrode and the torch can be raised rapidly so as to withdraw the electrode from the molten metal. It can then be rapidly replaced and the torch brought back to operating position with the replacement metal contact electrode to enable the process to continue without wastage of the charge of molten metal in the tundish.

The reservoir 27 of molten metal in the tundish well 26 may be preheated to a temperature of the order of 1635° C., whereupon the tundish outlet 40 is opened to allow the molten metal to flow from the tundish 18 via outlet 5 nozzle 42 to the delivery nozzle 19a and into the nip between the casting rolls to establish a casting pool. As the molten metal flows through the narrow flow passages in the delivery nozzle it brings the flow passages up to a uniform temperature while avoiding cooling of any of the metal to temperatures which might produce premature solidification.

When stable casting has been established the slide gate from the ladle is operated to pour metal from the ladle into the tundish so as to fill the tundish and to maintain a full tundish as casting proceeds. The plasma torch 48 and electrode 52 are raised prior to operation of the ladle so as to avoid damage by the incoming metal. Molten metal at the ladle temperature then mixes with the remainder of the initial batch of higher temperature metal in the tundish so that the temperature of the metal flowing from the tundish drops. At this stage the plasma arc torch may be positioned above the new level of the reservoir of molten metal in the tundish and operated to apply heat energy to the molten metal flowing through the tundish from the ladle so as to maintain the temperature of the metal flowing to the delivery nozzle substantially constant at a temperature below that of the initial batch which was preheated in the well 26. Because the return electrode 52 moves with the plasma torch it will automatically be set to dip into the molten metal at the appropriate position and to the appropriate depth at the new metal surface level.

In a typical installation tundish 18 may have a total capacity of about 8 to 11 tonnes, well 26 may have a capacity of about 2 to 4 tonnes and plasma arc torch 48 may have a capacity of the order of 1 Megawatt.

The illustrated apparatus has been advanced by way of example and it could be modified considerably. For example the plasma torch and/or the metal contact electrode could be independently moveable vertically on the cantilever arm 56 to enable the depth of penetration of the metal contact electrode to be adjusted. One or both of these components could also be adjustable longitudinally of the arm to enable lateral separation between the torch and the return electrode to be adjusted. The physical design of the support stand and moving carriage and the torch/electrode support structure can be modified to suit particular applications. It is accordingly to be understood that the invention is in no way limited to the illustrated apparatus and that many modifications and variations will fall within its spirit and scope.

I claim:

1. Apparatus for applying heat to a reservoir of molten metal, comprising:

a container to hold the reservoir of molten metal to be heated;

a raiseable and lowerable structure extending over said container;

hoist means operable to raise and lower said structure over the container;

a plasma torch mounted on said structure so as to extend downwardly from that structure into proximity with the surface of the reservoir of molten metal within the container;

an elongate refractory return electrode mounted on said structure at a location spaced apart from the mounting of the plasma torch on said structure so as to extend downwardly from the structure such that the electrode and the torch are in spaced apart relationship, the electrode being set relative to the plasma torch so as to project downwardly below the bottom of the plasma torch whereby to dip into the reservoir of molten metal to be heated at a location spaced laterally away from the plasma torch as the bottom of the plasma torch approaches the surface of the molten metal, the electrode being removable from said structure and replaceable independently of the plasma torch.

2. Apparatus as claimed in claim 1, further comprising a longitudinal passage formed in said electrode for flow of gas therethrough into the molten metal and a gas pressure detector to detect a change in pressure of gas flowing to said passage consequent on breakage of said electrode necessitating replacement of the electrode.

3. Apparatus as claimed in claim 1, wherein said structure is in the form of a cantilever arm extending outwardly over the container from a carriage movable up and down on a stand located adjacent said container.

* * * * *